US009651719B2

(12) United States Patent
Smith

(10) Patent No.: US 9,651,719 B2
(45) Date of Patent: May 16, 2017

(54) APERTURE FOR NIGHT VISION GOGGLES FOR USE IN AIRCRAFT SIMULATOR OR OTHER SIMULATORS

(71) Applicant: Veraxx Engineering Corporation, Chantilly, VA (US)

(72) Inventor: Charles Smith, Chantilly, VA (US)

(73) Assignee: Veraxx Engineering Corporation, Chantilly, VA (US)

( * ) Notice: Subject to any disclaimer, the term of this patent is extended or adjusted under 35 U.S.C. 154(b) by 313 days.

(21) Appl. No.: 13/951,023

(22) Filed: Jul. 25, 2013

(65) Prior Publication Data

US 2014/0030692 A1 Jan. 30, 2014

Related U.S. Application Data

(60) Provisional application No. 61/676,085, filed on Jul. 26, 2012.

(51) Int. Cl.
*G09B 9/00* (2006.01)
*G02B 5/00* (2006.01)
*G02B 23/12* (2006.01)

(52) U.S. Cl.
CPC .......... *G02B 5/005* (2013.01); *G02B 23/125* (2013.01); *G09B 9/00* (2013.01); *G09B 9/003* (2013.01)

(58) Field of Classification Search
CPC .......... G09B 9/003; G09B 9/005; G03B 9/02
USPC .......................... 434/1–27, 41–44, 365, 372
See application file for complete search history.

(56) References Cited

U.S. PATENT DOCUMENTS 4,376,889 A * 3/1983 Swift .................... 250/214 VT
4,729,649 A * 3/1988 Thompson .................... 359/511
5,380,204 A * 1/1995 Decker .......................... 434/36
5,473,472 A * 12/1995 Temme et al. ................ 359/600
5,502,455 A * 3/1996 Ferrin ................. G02B 23/125 345/9
5,617,257 A * 4/1997 Sheehy et al. ................ 359/818
5,760,953 A 6/1998 Task et al.
6,194,701 B1 * 2/2001 Task et al. ............ 250/214 VT
6,196,845 B1 3/2001 Streid
7,706,062 B2 * 4/2010 Ramboyong et al. ........ 359/399
2008/0247048 A1 * 10/2008 Francois et al. .............. 359/631

(Continued)

FOREIGN PATENT DOCUMENTS

DE 3701337 A1 * 7/1988 .............. G03B 9/02
WO WO2010056702 5/2010

*Primary Examiner* — Sam Yao
*Assistant Examiner* — Michael Humphrey
(74) *Attorney, Agent, or Firm* — Whitham, Curtis & Cook

(57) ABSTRACT

An aperture mechanism for night vision goggles (NVG) has a first end, a second end, a lens engaging portion, and a cone portion. A lens engaging portion has a recession allowing attachment of the aperture mechanism to a light admitting end of the NVG. A cone portion is opposite the lens engaging portion. Together the lens engaging portion and the cone portion form an aperture. The aperture mechanism increases the depth of field of the NVG for applications involving small object-to-goggle distances, such as in simulators or simulator environments. In a simulator system, the aperture mechanism can be attached to NVG such that at least a portion of light from a display screen is blocked. The light output of the display screen can be increased such that the depth of field remains higher but the image produced does not become darker.

13 Claims, 7 Drawing Sheets light from
display
screen
10
19
2
18

(56) References Cited

U.S. PATENT DOCUMENTS

| | | | | |
|---|---|---|---|---|
| 2009/0253104 | A1* | 10/2009 | Burggraf et al. | 434/41 |
| 2010/0187417 | A1 | 7/2010 | Hanna et al. | |
| 2012/0315603 | A1* | 12/2012 | Streid | 434/37 |
| 2014/0071547 | A1* | 3/2014 | O'Neill | G02B 7/02 359/827 |

* cited by examiner

APERTURE FOR NIGHT VISION GOGGLES FOR USE IN AIRCRAFT SIMULATOR OR OTHER SIMULATORS

CROSS-REFERENCE TO RELATED APPLICATIONS

This application claims benefit of U.S. Provisional Patent Application No. 61/676,085 filed Jul. 26, 2012, the complete contents of which are hereby incorporated by reference.

DESCRIPTION

Field of the Invention

The invention generally relates to an aperture mechanism for night vision goggles and, more particularly, to an aperture mechanism which is intended for, but not limited to, improving depth of field of night vision goggles and methods of using such an aperture mechanism.

Background

Since their introduction during World War II, night vision devices have been used in a variety of applications in which unassisted vision with the naked eye is either impaired or impossible due to insufficient light in the visible spectrum. Night vision devices, and in particular night vision goggles (NVG), are available commercially in some parts of the United States and the world for such purposes as gaming and hunting. The types of night vision goggles available to the general public, however, is sometimes limited by local or federal law, with the most advanced night vision devices typically being developed for and used by the military and law enforcement agencies.

Military or law enforcement night vision goggles are designed for use in the field for such purposes as combat, reconnaissance, and surveillance. In both civilian and military applications, NVG are typically used for focusing on and viewing objects which are at a distance of twenty feet or more from the individual wearing the goggles. This provides a broad field of view to the wearer and permits him or her to see a wide variety of objects or targets which are in front of the wearer at various distances.

NVG may also be worn in simulators for training purposes, an example being aircraft simulators. In simulator environments, computer generated images of targets, objects, and other features are presented to the trainee on display screens. Because of space limitations in simulators or due to the desirability for efficient use of space, display screens may be very short distances (e.g. on the order of four to six feet) from the trainee while he or she is wearing and using the NVG. These object-to-goggle distances are considerably shorter than in field applications where the goggles are focused on objects which are normally twenty feet or more away from the wearer. These limitations in technology, logistics, and/or cost which may limit the ability to accommodate object-to-goggle distances representative of field applications result in a serious drawback, namely that appreciable movement of the user's head will cause the NVG to move beyond the device's depth of focus. That is to say, in a simulator or simulator environment, the image produced by NVG will often go out of focus if the user moves the device only a few inches closer or further from the screen.

WO2010056702 to Hanna et al. (hereafter "Hanna") describes a device for attaching to the end of NVG for improving focus. A panel with a small aperture can be placed in front of the lens of NVG so as to filter light. The panel can be installed and removed as needed depending on the desired light levels and focus of the user. Because the panel aperture is displaced from the lens of the NVG, the field of view of the goggles is reduced. Furthermore, apertures such as that in Hanna generally result in the image produced by the NVG having a border with altered appearance, for instance that of being out of focus. Because the structure of the device is essentially a cylinder with a flat end containing a hole, light is able to undesirably illuminate a portion of the panel sitting directly in front of the lens. FIG. 7 of Hanna shows a front panel (40) with a thickness such that aperture (45) has an edge which can be undesirably illuminated. This problem worsens the greater the distance between the aperture of the focus device and lens of the NVG.

SUMMARY

According to the present invention, many objects and advantages are achieved in an aperture mechanism generally having a first or back end, a second or front end, a lens engaging portion, and a cone portion. A lens engaging portion is at the back end and allows attachment of the aperture mechanism to a light admitting end of NVG. The lens engaging portion has an annular recession for receiving an end of NVG containing a light admitting part, such as an optical lens, which admits light into the NVG. The recession extends from the back end of the aperture mechanism toward the front end and has a diameter which is less than the outer diameter of the aperture mechanism at the back end. This can provide a wall, the inner surface of which is a friction fit surface for engaging an outer surface of the end of the NVG. A cone portion opposite the lens engaging portion is preferably in contact with the light admitting part of the NVG and forms a cone shaped aperture for admitting light.

In an exemplary embodiment, the aperture mechanism is used to increase the depth of field of night vision goggles (NVG) for an environment having short object-to-goggle distances. Short object-to-goggle distances are less than twenty feet, or more preferably less than ten feet. This is accomplished by attaching an aperture mechanism to a light admitting end of NVG, aligning the aperture mechanism with a light admitting part of the NVG such that light admitted to the NVG by the light admitting part passes through the aperture of the aperture mechanism. The NVG is then aimed in a direction such that light from an object passes through the aperture and into the NVG. The NVG produces an image from the admitted light. The aperture mechanism reduces the volume of light admitted to the lens/light admitting part of the NVG, specifically blocking light from passing through the outer extremity of the lens. As a result, light is only passed through an inner portion of the lens. One skilled in the art will recognize that the size of the outer extremity of the lens to which light is blocked by the NVG (and accordingly, the size of the inner portion of the lens through which light is permitted to pass) may vary in the practice of the invention. As a result of the reduction in volume of admitted light, the aperture mechanism reduces the fraction of light from the object which the NVG uses in producing an image of the object. An exemplary application of the present invention is in a simulator environment, wherein the amount of light from the object (reflected and/or emitted) can be controlled and increased as needed to achieve a desired brightness of an image produced by the NVG from light passed through the aperture mechanism.

In an exemplary embodiment, the aperture mechanism is used to decrease the amount of light admitted to the light admitting end of NVG. In a simulator environment, creating a large field of view can be achieved by employing multiple image displays. In a simulator, including but not limited to an aircraft simulator, there are usually multiple projectors each projecting an image in front of the trainee or trainees, usually on a dome shaped display screen. A technique known as edge blending is used to combine the separate projected images such that the screen appears to show just one aggregate image seemingly generated by a single light source in spite of the aggregate image comprising multiple images produced by a plurality of separate light sources. Edge blending is most effective when adjacent images are bright. That is to say, the brighter the adjacent images, the better their blending properties and the appearance of seamlessness from one image to the next where their borders meet. Thus in a simulator environment where multiple image sources are used in conjunction with one another, it is advantageous for the image sources to produce bright images in order to achieve a seamless/continuous aggregate image. Two or more images with insufficient brightness will not appear seamless/continuous from one to the next; there will be visible borders outlining one or more portions of the image produced by independent image sources.

Because NVGs are designed to be used in low light scenarios, the brightness of the image(s) on the display screen is usually reduced to a low level so as not to overpower the NVG. Reduction of display screen light intensity yields poorer edge blending, thus making the borders of the individual projected images more apparent. An advantage of the present invention is the possibility to improve edge blending in simulator environments. Attaching an aperture mechanism to the light admitting end of NVG and thereby blocking a portion of the light normally admitted to the NVG allows the brightness of the images to be brighter than otherwise possible with NVG absent the aperture mechanism, thus achieving a superior aggregate image with improved edge blending and continuity.

DETAILED DESCRIPTION

An aperture mechanism may be used with one or more night vision devices such as but not limited to optical scopes (such as on a rifle) and night vision goggles (NVG). Although exemplary embodiments of the invention will be described herein in reference to NVG, it is to be understood that the present invention is not limited to NVG and that an aperture mechanism and uses thereof may be used with any night vision device.

It is noted that as used herein, "NVG" may refer to a goggle, a pair of goggles, or a plurality of goggles/pairs of goggles. In general, "a NVG" will be used to indicate a goggle or a pair of goggles; "NVGs" will be used to indicate a plurality of goggles or pairs of goggles; and "the NVG" or simply "NVG" without a proceeding article will be used to indicate "night visions goggles" which may be singular or plural according to the context of use, as it is conventionally understood among English speakers.

Figure 1A:
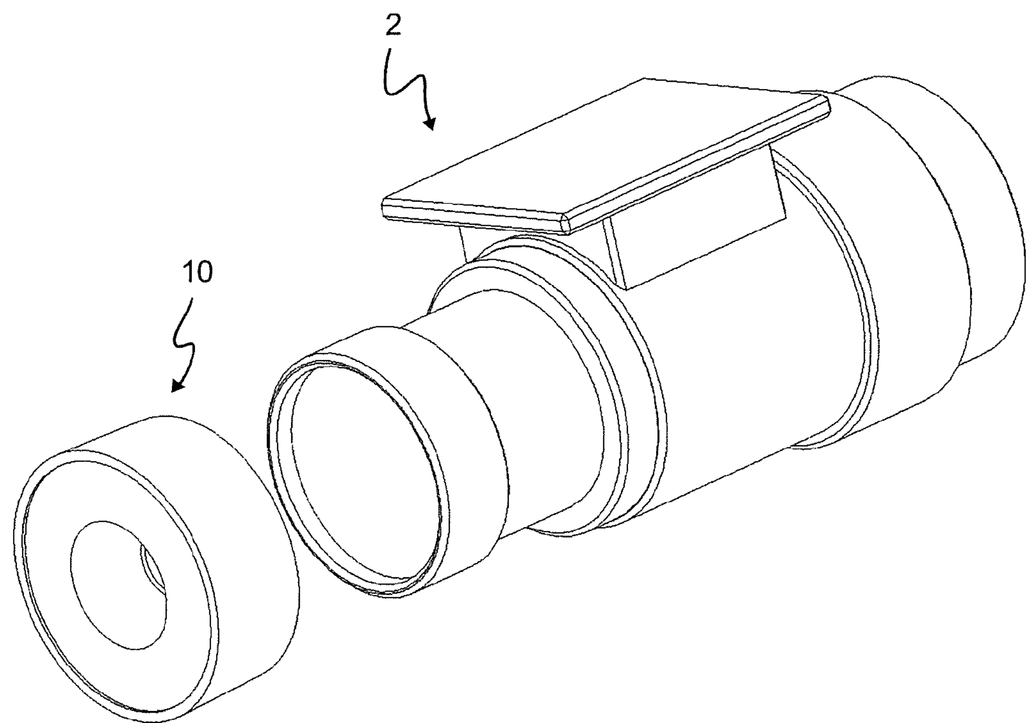
FIGS. 1A-1D are isometric views of monocular and binocular NVGs without and with aperture mechanism(s) attached to (a) light admitting end(s) thereof.
Figure 1B:
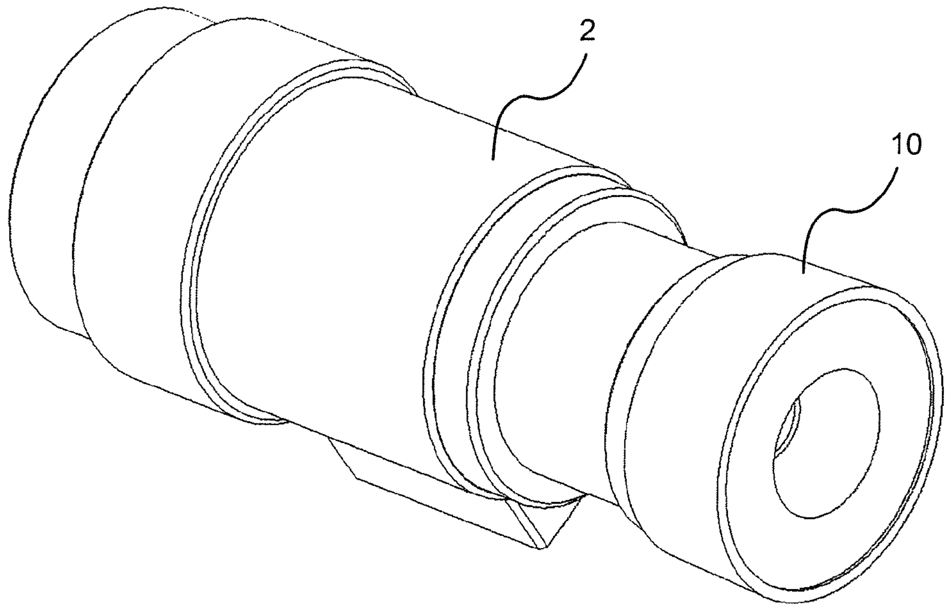
Figure 1C:
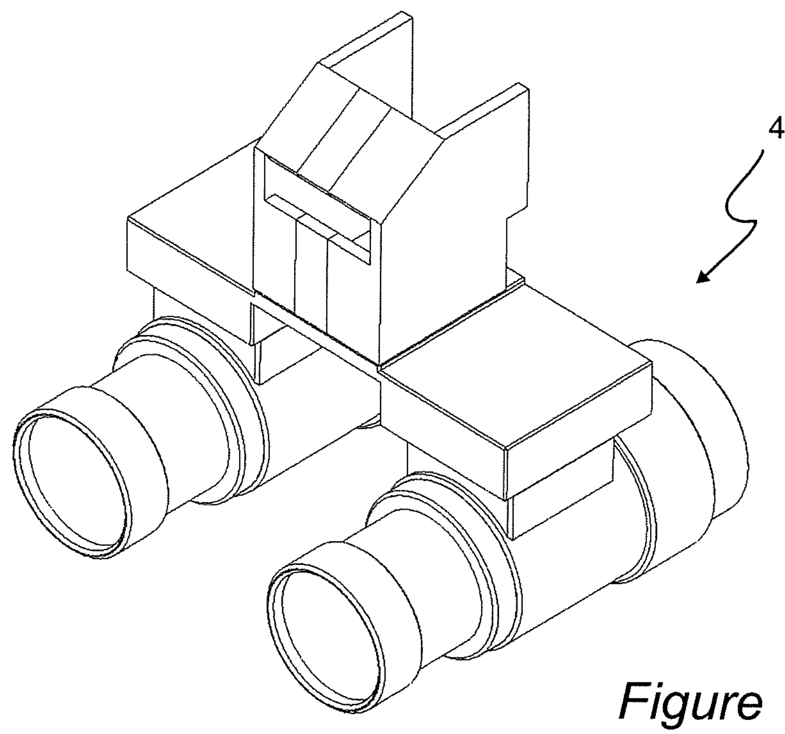
Figure 1D:
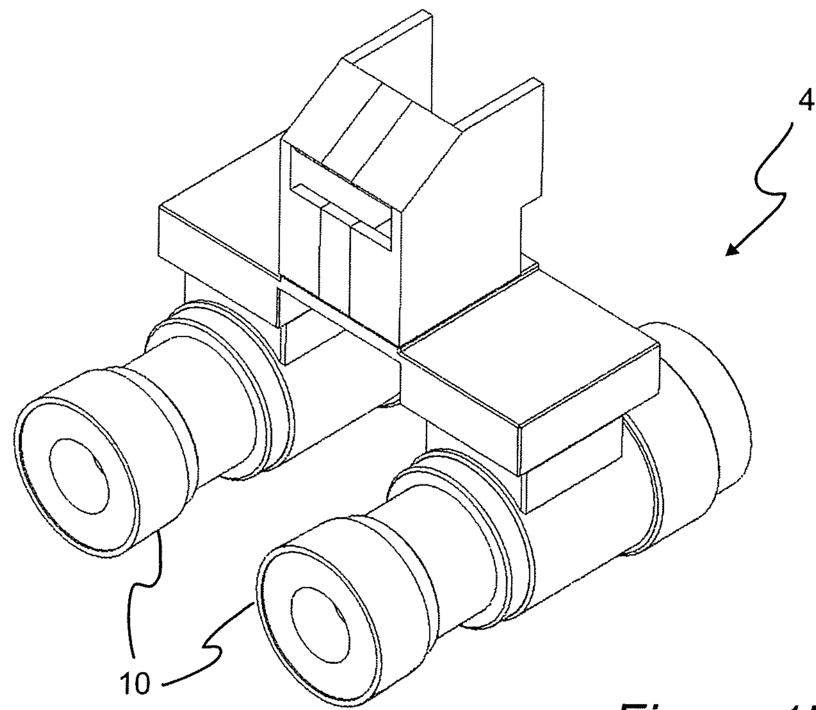
Figure 2A:
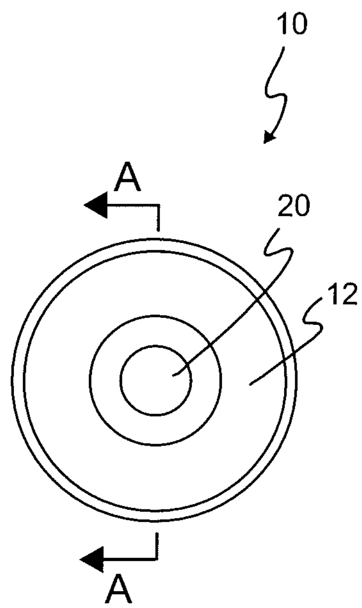
FIGS. 2A-2D are, respectively, a front elevation view, a cross-section view, a front isometric view, and a rear isometric view of an aperture mechanism.
Figure 2B:
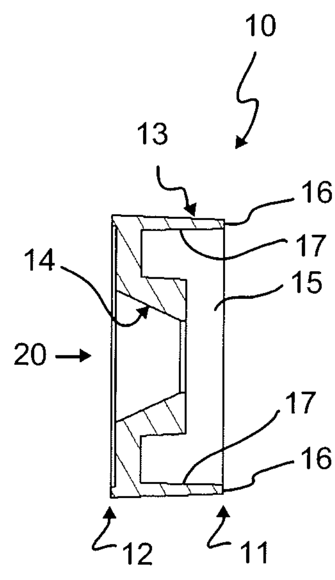
Figure 2C:
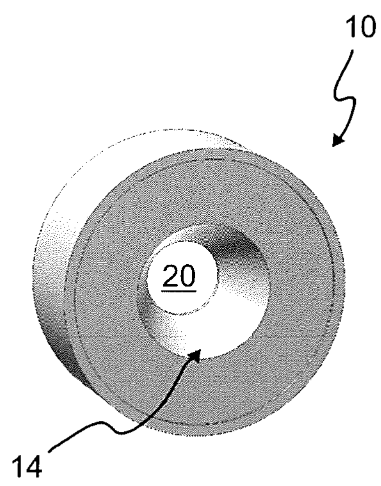
Figure 2D:
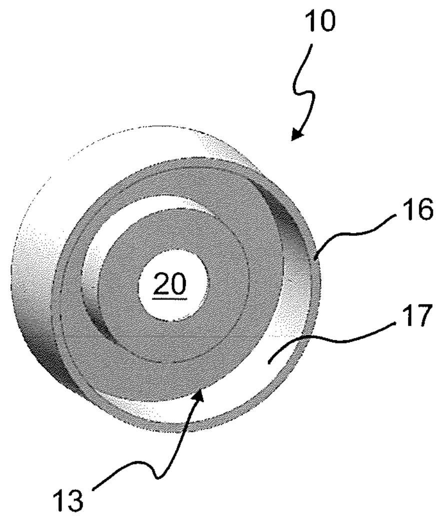

Referring now to the drawings, and more particularly to FIGS. 1A-1D, night vision goggles may be monocular, with, for example, one intensifier tube, or binocular, with two intensifier tubes, usually one for each eye. FIGS. 1A and 1B show monocular NVG 2 without and then with an aperture mechanism 10 attached. Similarly, FIGS. 1C and 1D show binocular NVG 4 without and then with aperture mechanisms 10 attached. In some cases NVG have more than two intensifier tubes, for example four in the case of panoramic night vision goggles (PNVGs). One or more aperture mechanisms may be used at the same time such that each light admitting unit of NVG (comprising lens, intensifier tube, etc) may be fitted with an aperture mechanism. Multiple aperture mechanisms may also be fixedly attached to one another, either during or after manufacture, to facilitate ease of installation of the multiple aperture mechanisms on NVG at the same time. Unless otherwise noted, an end of NVG which can receive an aperture mechanism may also be called an NVG lens, since an end of the NVG usually contains a lens which admits light passed into the intensifier tube. An aperture mechanism according the present invention regulates the admission of light to this lens, as will be discussed.

The term "light" as used herein generally refers to the electromagnetic spectrum, more specifically wavelengths of electromagnetic waves which NVG are configured to use to produce an image. Light may include infrared light such as with a first generation NVG or visible light. Many NVG are configured to produce images from small amounts of available visible light, such as from stars or the moon in outdoor field environments. Any NVG or night vision device may be fitted with or otherwise utilize an aperture mechanism in accordance with the disclosed invention.

Referring now to FIGS. 2A-3C, an aperture mechanism 10 generally has a first or back end 11, a second or front end 12, a lens engaging portion 13, and a cone portion 14. A lens engaging portion 13 is at the back end and allows attachment of the aperture mechanism to a light admitting end 18 of NVG. An exemplary lens engaging portion 13 has an annular recession 15 for receiving the end 18 of a NVG containing a lens 19 which admits light into the device. The recession 15 extends from the back end of the aperture mechanism toward the front end and has a diameter which is less than the outer diameter of the aperture mechanism at the back end. This provides a wall 16, the inner surface of which is a friction fit surface 17.

An inner diameter of the recession can vary along the axial direction of the recession. For instance, the recession may become narrower further from the end, such that the fit during insertion of an end of a NVG into the recession may become progressively tighter (more "snug") the further into the recession the end of the NVG is inserted. The size of the recession, and likewise the diameter or size of an entire aperture mechanism, may be selected according to NVG with which the aperture mechanism is intended to be used. The size of the recession with relation to the end of NVG may depend on the material of which the aperture mechanism is made. Many suitable materials will occur to those of skill in the art, but exemplary materials include rubber or silicone or, alternatively, a metal such as anodized aluminum. A rubber or silicone aperture mechanism provides a friction fit surface 17 which has a high coefficient of friction. This offers the advantage of an improved hold of the aperture mechanism on an end of NVG when the mechanism is mounted and in use. Rubber and silicone being slightly stretchable, an inner diameter of the recession of a lens engaging portion may be smaller than an outer diameter of the end of NVG such that attachment of a lens engaging portion to an end of the NVG forces the opening of the recession to expand slightly. While mounted, this can increase the radial/normal forces and thereby the frictional forces between a wall 16 of the lens engaging portion and an outer surface of the end of NVG which is inserted into the recession of the aperture mechanism. The result is an improved friction grip of the aperture mechanism on the NVG which reduces the probability of the mechanism being accidently removed, for instance if bumped against a foreign object.

An aperture mechanism may be made of plastic, this being preferable in some applications because of its low manufacturing cost and easy sizing for a friction fit between a lens engaging portion and an end of NVG. In the alternative that an aperture mechanism is made of metal, a screw fitting on the interior may be used to secure the mechanism to NVG. The screw is rotatable to selectively secure a lens engaging portion to a NVG lens. The screw is disposed in the wall 16 of the lens engaging portion and can project into the recession 15. Tightening of the screw drives the end of the screw radially inward such that when the mechanism is mounted or attached to NVG, the end of the screw bears against an outer surface of the NVG to hold the aperture mechanism fixed relative thereto.

Other attachment means for the lens engaging portion will occur to one of skill in the art in view of the teachings herein. These include but are not limited to adhesives, clips, latches, and loop-and-hook materials. FIGS. 1B and 1D show, respectively, monocular NVG and binocular NVG with aperture mechanisms mounted with a friction fit.

Figure 3A:
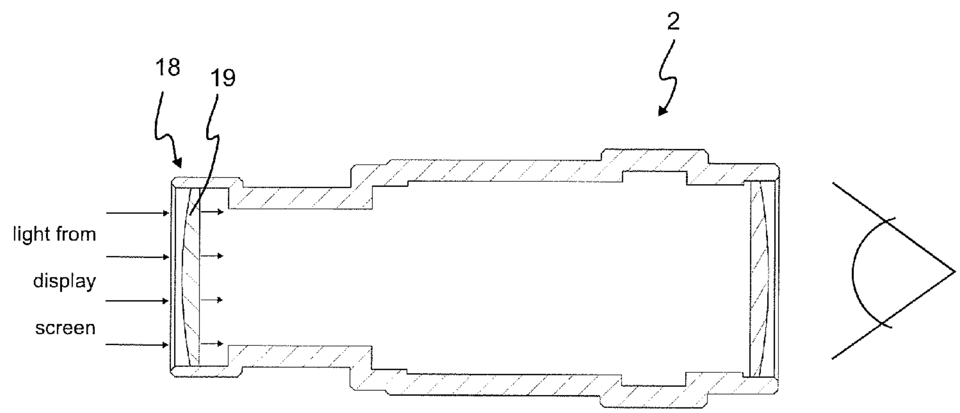
FIGS. 3A-3C are views showing engagement of an aperture mechanism with NVG.
Figure 3B:
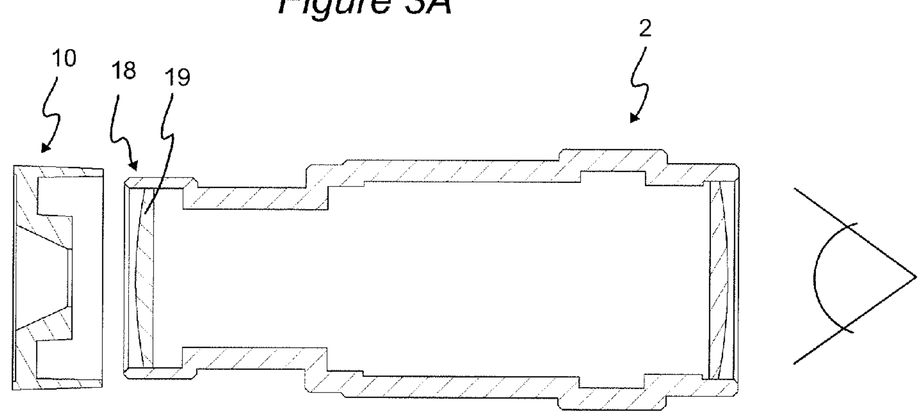
Figure 3C:
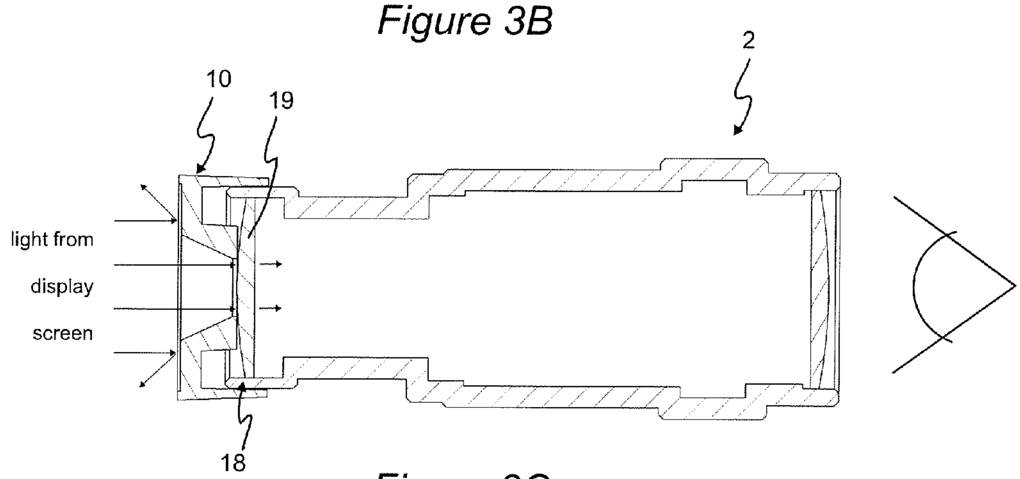

A cone portion 14 is disposed at a front end 12, opposite the lens engaging portion 13. Together a lens engaging portion and a cone portion form an aperture 20 continuous from the first end to the second end of the aperture mechanism. FIGS. 3A-3C show attachment of an aperture mechanism 10 to a light admitting end 18 of NVG 2, the internal components of which can vary and are not depicted in the figures. The cone portion 14 is preferably in contact with the light admitting part of the NVG 2, here an optical lens 19. An aperture mechanism can selectively block light from lens 19 such that light which is admitted to the NVG for formation of an image must pass through the aperture. A cone portion 14, as indicated by its name, preferably forms a cone shaped aperture, wherein the interior diameter generally increases from where the cone portion meets a lens engaging portion to the front end of the aperture mechanism. In embodiments where the cone portion contacts the lens of the NVG, the cross-sectional diameter of the cone aperture preferably increases from a point which is substantially located where the cone portion is in contact with the optical lens of the NVG (when mounted) to the front end of the aperture mechanism. While the cone shaped portion is depicted as cone-shaped, it may also be pyramidal, cylindrical, or take other polygonal, curved, or parabolic shapes, for instance a parabolic bowl with a concave inner surface with an aperture opening at the bottom/end of the bowl.

A direct contact interface between cone portion 14 of the aperture mechanism and lens 19 of the NVG, as shown in FIG. 3C, allows greater control of the light admitted to the NVG and eliminates the visual perception of looking through a hole or tunnel when using the NVG. The aperture reduces the volume of light admitted to the lens, specifically blocking light from passing through an outer extremity of the lens. This is apparent in FIGS. 3A and 3C where the light admitted to the NVG lens is shown. (Note that the arrows indicative of light are illustrative and do not show the actual effect of the lens 19 on the direction/focusing of the light passing through the lens.) After engaging the aperture mechanism with the lens of the NVG, light is blocked from an outer extremity and admitted only to an inner portion of the lens. Blocking the outer extremity of the lens increases the depth of field of the NVG. Contact between the cone portion 14 and the lens 19, together with the three dimensional cone shape of the aperture, allows the aperture mechanism to maintain the same field of view of the NVG. Prior apertures known in the art usually reduce the field of view of NVG.

The size (e.g. height) and taper/angle of a cone aperture through a cone portion can be selected according to the amount of light to be admitted to the NVG for formation of an image. A cone aperture is preferably sized to be as wide as the field of view of the NVG. The depth of field can be increased by stopping down a NVG's objective lens with an aperture. The optics of the invention can be compared with the optics of a typical lens aperture of a camera. An aperture is typically used to control the amount of light which is incident upon or passing through a lens. It may be used to increase the depth of field for an object or image of an object being viewed, as is the case in the present invention. The range of movement of NVG or a wearer's head toward or away from the viewing object or image without loss of focus becomes greater. An object or image is characterized as staying "in focus" for a range of object-to-goggle distances if the image quality (e.g. distinctness and clarity) may be characterized as having negligible variation at all object-to-goggle distances within that range without adjustment of settings on the optics device itself Tests have shown that the aperture mechanism disclosed herein about doubles the focus range of NVG for short (e.g. less than 20 feet) object-to-goggle distances.

NVG depth of focus testing is required in some simulators. This is done in order to ensure the trainee has the ability to move his/her head an acceptable distance towards and away from the display without the image which is being displayed going out of focus.

As an example, the requirements for a simulator may be that the trainee must be able to move 9 inches back, 4 inches forward, and 7 inches down from a neutral viewing position without any noticeable focus degradation. This is not possible in known simulator environments absent an aperture mechanism being used with the NVG as taught according to the present invention.

In some embodiments, the aperture mechanism is manufactured as a single device, with a lens engaging portion and a cone portion being integral with one another. This is shown in the figures. Alternatively, the aperture mechanism may comprise multiple parts, with, for example, a separate lens engaging portion and cone portion. A lens engaging portion may be attachable to a NVG lens, and a cone portion may be attached to the lens engaging portion such that the cone portion alone can be engaged or disengaged from the lens engaging portion as needed for small object-to-goggle distances and large object-to-goggle distances, respectively. Some embodiments may also have a gripping portion on an outer surface of either or both a lens engaging portion and a cone portion. The gripping portion improves ease of engaging and disengaging the lens engaging portion from an end of the NVG lens and/or a cone portion from a lens engaging portion (in an embodiment where the two are separable).

Figure 4A:
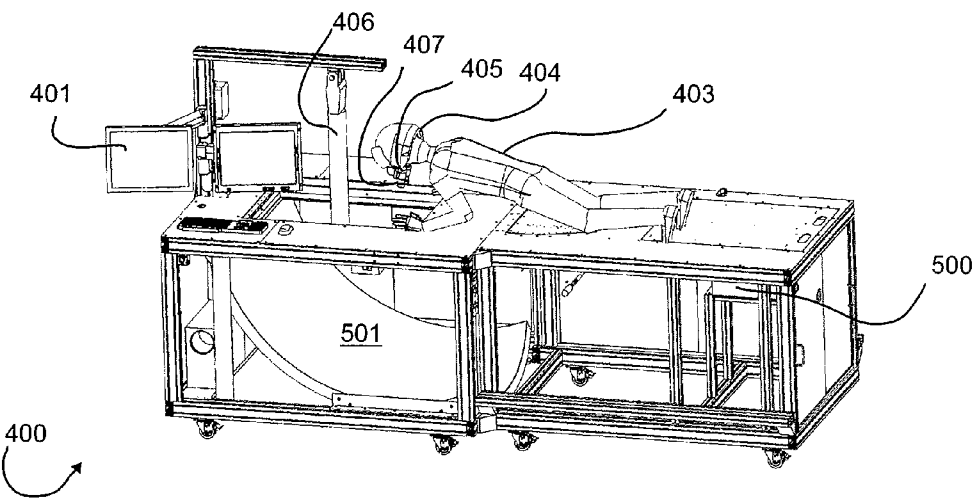
FIGS. 4A-4C show a simulator system which includes an aperture mechanism.
Figure 4B:
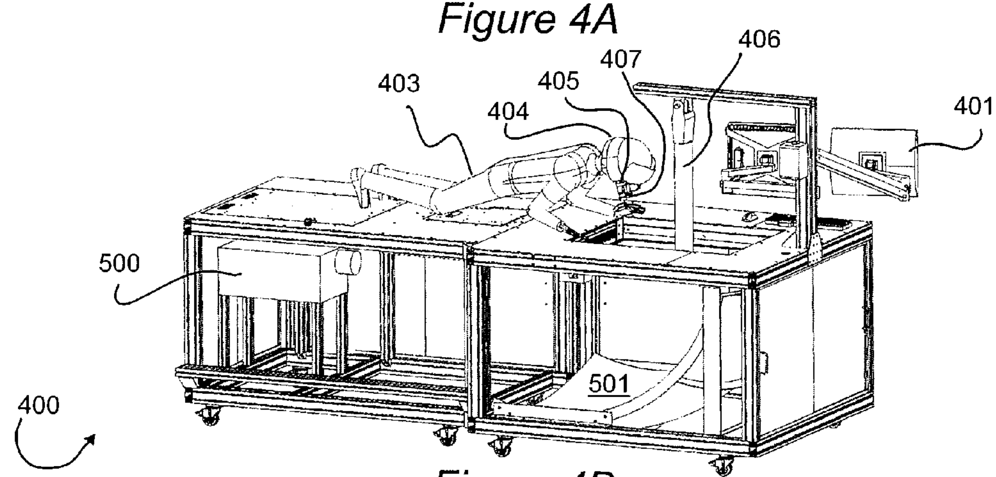
Figure 4C:
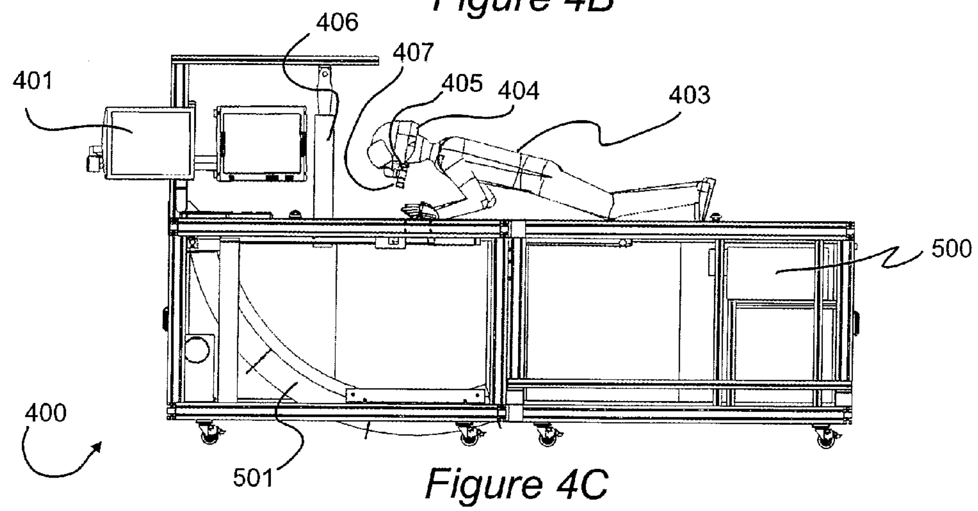
Figure 5A:
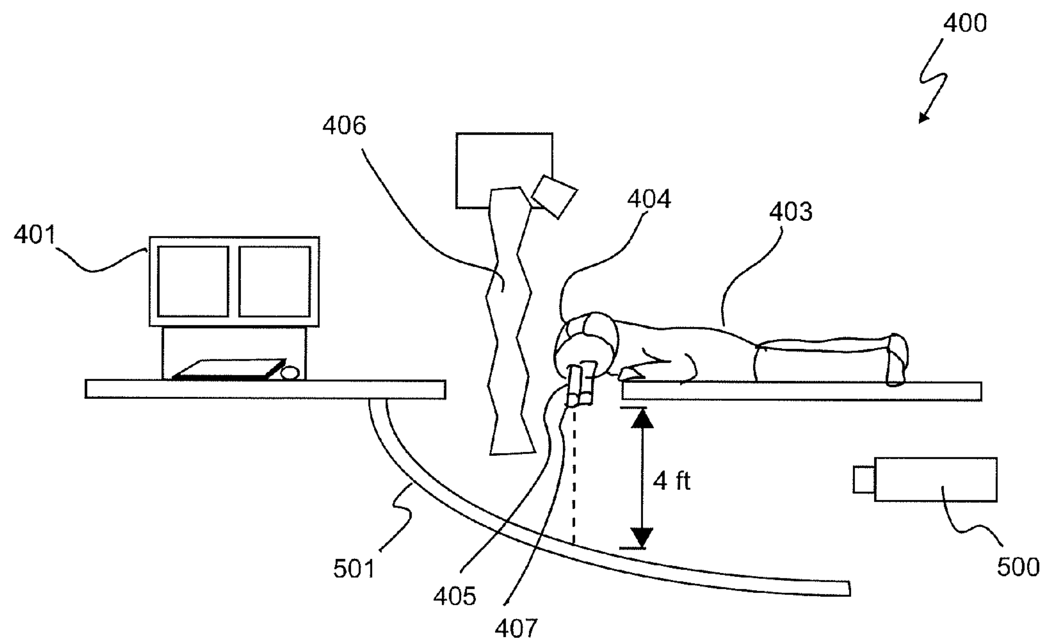
FIGS. 5A and 5B are illustrations of a simulator system with an aperture mechanism as shown in FIGS. 4A-4C.
Figure 5B:
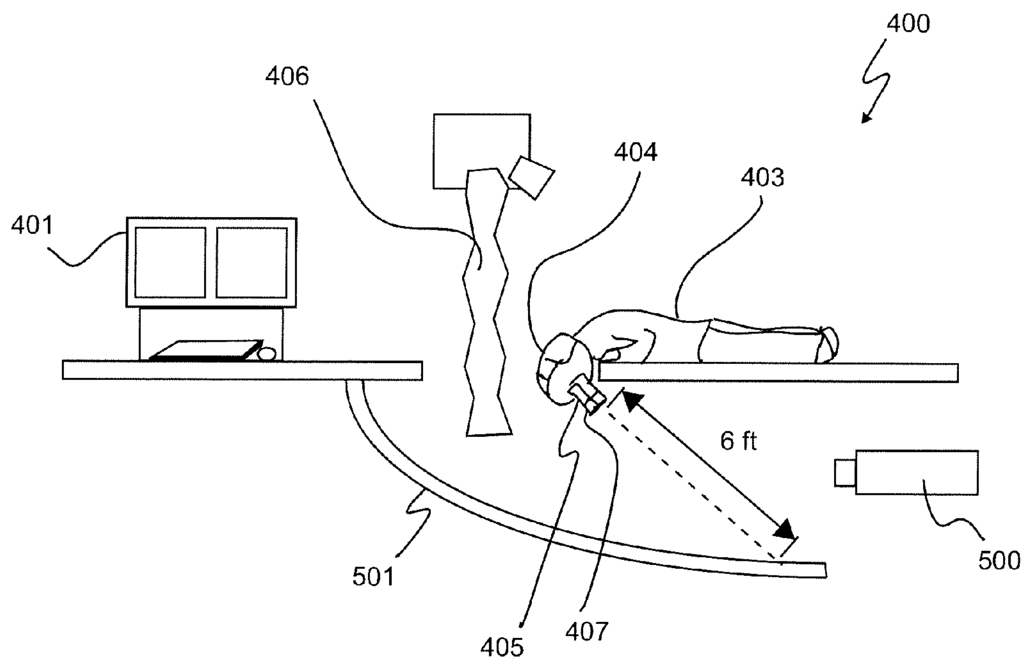

Referring now to FIGS. 4A-5B, a training or simulator system 400 is shown including a computer control module 401, equipment representative of the simulated field environment, and a display screen 501. Although FIGS. 4A-4C show a simulator system with just one projector 500 for projecting an image onto a display screen 501, a plurality of projectors 500 can also be used and their images combined via edge blending. A user 403 is fitted with headgear 404 which includes a pair of NVG 405. The simulator system shown in the figures is an aircraft simulator. In a field environment, a user or trainee 403 such as a U.S. marine may be lying on a floor of an aircraft peering out from an underside of the aircraft. One example task required of the user is alignment of an extendable arm 406 to a land vehicle in order to perform an air lift. Looking down as in FIG. 5A, a user may have a first object-to-goggle distance of four feet, for example. Looking down and to a side, as in FIG. 5B, a user may have a second object-to-goggle distance, such as six feet. Fitted only with NVG 405, a user may be provided an image of the display screen 501 which goes out of focus for a small change in object-to-goggle distance, even as small as a change from 4 ft to 6 ft. That is to say, the depth of field of the NVG is small, in this case less than 2 ft. In order for an image generated by NVG to be in focus for multiple different object-to-goggle distances (such as in both configurations shown in FIGS. 5A and 5B), a user must re-adjust the night vision goggle optics for each change in head position or change in viewing object (such as a change to what region of the display 501 the user is viewing). FIGS. 4A-5B show affixed the end of binocular NVG 405 a pair of aperture mechanisms 407. Aperture mechanisms 407 increase the depth of field of the NVG 405 to 2 ft or greater such that the NVG can provide a user 403 with a clear image for every possible object-to-goggle distance between the display screen 501 and the NVG 405.

Figure 6:
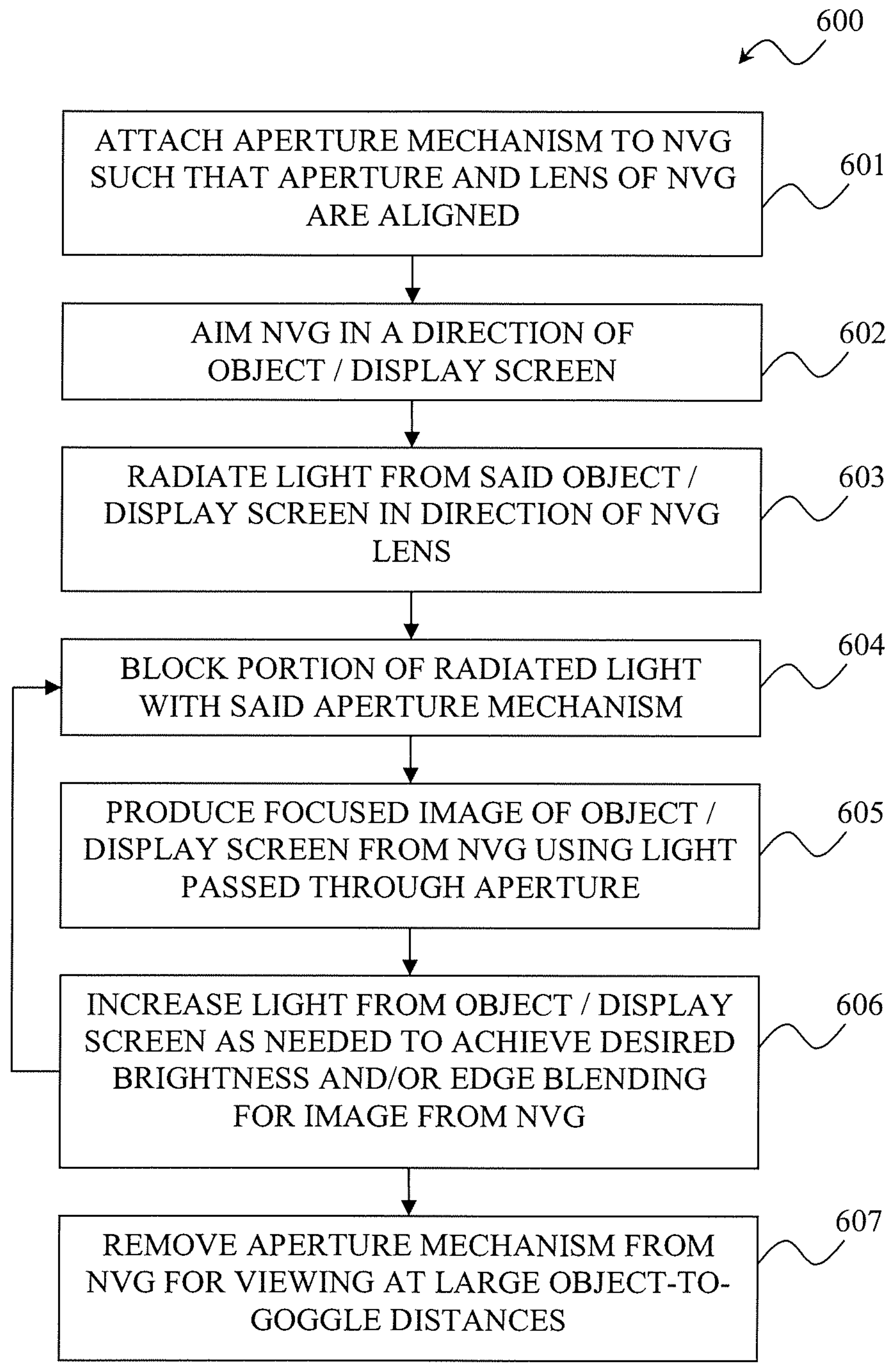
FIG. 6 is a process for using an aperture mechanism.

Provided is a method including use of an aperture mechanism which overcomes the poor depth of field common for night vision goggles operating in short (e.g. less than 20 feet) object-to-goggle distance environments such as in simulators and simulator systems. FIG. 6 shows a process 600 for using night vision goggles in a simulator system with at least one display or display screen. Process 600 may be used to increase a depth of field of NVG, providing and maintaining a focused image for a depth of field the upper and lower limits of which are at least the largest and smallest object-to-goggle distances, respectively, in a simulator system.

A user first attaches to NVG an aperture mechanism having an aperture therethrough such that the aperture is aligned with a light admitting part of the NVG, and light which is admitted to the NVG passes through the aperture (step 601). The NVG is then aimed in a direction of at least one display screen (step 602). Light is radiated from the one or more display screens in a direction of the NVG's light admitting part (step 603). This light may be emitted by the screen itself or may be reflected from a surface thereof. In simulator environments, one or more projectors are commonly used to project images onto the display/screen. NVG without an attached aperture mechanism admit all the light radiated toward the light admitting part of the NVG, such as depicted in FIG. 3A. The aperture mechanism, however, blocks at least a portion of the total amount of light radiated toward the NVG, specifically that light which would otherwise pass through an extremity of the lens (step 604). As a result, the NVG admits only a portion of the light, namely that which passes through the aperture of the aperture mechanism as illustrated in FIG. 3C. The NVG produces a focused image of the one or more display screens using light which passed through the aperture (step 605). It is preferable that only light which has passed through the aperture of the aperture mechanism is used in formation of an image of the screen. Generally, method 600 is usable for producing a focused image of the display for a range of object-to-goggle distances the upper and lower bounds of which are both less than twenty feet. The focused image is produced for a depth of field which is greater than an initial depth of field of NVG without the attached aperture mechanism. Generally, the aperture mechanism approximately doubles the depth of field of NVG in a simulator system. In some embodiments, aperture mechanism 407 is removably attachable. Should the object-to-goggle distance become large (e.g. equal to or greater than 20 feet), the aperture mechanism can be removed (step 607 of process 600) to allow production of a focused image of objects at large object-to-goggle distances.

An aperture mechanism according to the present invention is of particular use in simulators or simulation environments in which the amount of light from a viewing object (e.g. display screen) is adjustable. That is to say, the light from an object (reflected by the object and/or emitted by the object) can be increased or decreased using a control module. With regard to process 600, the display screen can be adjusted to radiate an additional amount of light in the direction of the NVG (step 606). The aperture mechanism will block at least a portion of the additional amount of light, but the overall amount of light admitted to the NVG will be higher. As a result, the image produced by the NVG will be brighter. The output of the display screen can in fact be such that a NVG without an aperture mechanism would be overexposed. Attachment of the aperture mechanism blocks a sufficient amount of the light, however, so as to prevent overexposure of the NVG while concurrently increasing the depth of field.

Referring again to FIGS. 4A-5B, the amount of light radiated by the display screen can be increased, for instance, by increasing the brightness, intensity, or output of projector 500 such that the image reflected by display screen 501 is brighter. The amount of light radiated can be adjusted to achieve a desired brightness of one or more images produced by the NVG without adjusting the settings of the NVG itself. The inclusion of this step is particularly significant for simulators and simulator environments, since field applications of NVG generally do not allow for increasing the amount of light from a viewing object.

An aperture mechanism can furthermore improve NVG performance with respect to multi-channel visual display systems. In such systems, a plurality of projectors may be used to generate multiple adjacent images. A technique known as edge blending is used to give the appearance of continuity and seamless from one projected image to the next as the eyes pass through the blend area between channels. These systems can have difficulty producing a clear and detailed image in the blend area between channels. This challenge is particularly true with NVG because of the very low light levels in nightscapes (night scenes or environments). Blend areas are usually not visible with the naked eye, but when viewed with NVG they are often quite noticeable. Since an aperture mechanism reduces the light level admitted to the goggles, the brightness level of the environment/object can be higher without overexposing NVG fitted with one or more aperture mechanisms. Generally, an aperture mechanism permits production of a focused and clear image at an environmental or image light intensity which is higher than a light intensity threshold of NVG (not having an aperture mechanism). Without an aperture mechanism such an elevated environmental or image light intensity would overexpose NVG. A higher light intensity or brightness renders blend areas less noticeable. Thus an aperture mechanism allows for a higher visual brightness level which in turn improves image quality in blend areas between channels of multi-channel visual display systems.

While an aperture mechanism has been described herein as being attachable or fixed to an outside of NVG, an aperture mechanism as taught herein may be added internally or externally to a NVG lens. An external aperture is preferred to lower cost and to allow NVG to quickly return to an unmodified state for normal use (e.g. object-to-goggle distances of 20 feet or more). After use of an aperture mechanism, the invention can be removed from NVG to permit use of the NVG in more traditional combat, reconnaissance, and surveillance applications.

While preferred embodiments of the present invention have been disclosed herein, one skilled in the art will recognize that various changes and modifications may be made without departing from the scope of the invention as defined by the following claims.

What is claimed is:

1. A method of using night vision goggles (NVG) in a simulator system with at least one display screen, comprising the steps of:

attaching to said NVG an aperture mechanism having a cone portion, wherein said aperture mechanism has a first end, a second end, an engaging portion extending from said first end toward said second end, and said cone portion extending from said engaging portion to said second end and wherein said cone portion has an aperture therethrough such that said aperture is aligned and in direct contact with a lens of said NVG;

aiming said NVG in a direction of a portion of said at least one display screen;

radiating an amount of light from said at least one display screen in a direction of said lens of said NVG;

blocking at least a portion of said amount of light radiated in said radiating step with said aperture mechanism; and producing a focused image with said NVG;

wherein said focused image is produced for multiple different portions of said at least one display screen having different object-to-goggle distances with said NVG, said multiple different portions of said at least one display screen being within a depth of field which is greater than an initial depth of field of said NVG without said attached aperture mechanism, said depth of field being a range of object-to-goggle distances, an upper bound and a lower bound of which are less than twenty feet.

2. The method of claim 1, further comprising the step of radiating an additional amount of light from said at least one display screen in a direction of said lens of said NVG, wherein said blocking step comprises blocking at least a portion of said additional amount of light radiated in second said radiating step with said aperture.

3. The method of claim 2, wherein said blocking step prevents overexposure of said NVG.

4. The method of claim 1, wherein said depth of field is equal to or less than 2 feet.

5. The method of claim 1, wherein said focused image is produced only from light passed through said aperture of said aperture mechanism directly into said lens of said NVG.

6. The method of claim 1, wherein said attaching is by a friction fit between an inner surface of said aperture mechanism and an outer surface of said NVG.

7. The method of claim 1, wherein said attaching step attaches said aperture mechanism externally to a light admitting end of said NVG.

8. The method of claim 7, wherein said attaching step comprises:

contacting the cone portion of said aperture mechanism with said lens; and engaging said engaging portion with a light admitting end of said NVG, wherein said cone portion forms said aperture continuous from a contact point with said lens to said second end after completion of said attaching step.

9. The method of claim 1, wherein said attaching step comprises aligning said aperture with said lens; and contacting a cone portion of said aperture mechanism with said lens.

10. The method of claim 1, wherein said blocking step is performed so that passage of light through said aperture is permitted only through a center inner portion of said lens.

11. A method of using night vision goggles (NVG) in a simulator system with at least one display screen radiating light in a direction of a lens of said NVG, comprising the steps of:

attaching to said NVG an aperture mechanism having a cone portion, wherein said aperture mechanism has a first end, a second end, an engaging portion extending from said first end toward said second end, and said cone portion extending from said engaging portion to said second end and wherein said cone portion has an aperture therethrough such that said aperture is aligned and in direct contact with said lens of said NVG and permits passage of light through only an inner portion of said lens;

positioning said NVG at a first object-to-goggle distance with respect to a viewing object of said at least one display screen;

producing a focused image of said viewing object with said NVG at said first object-to-goggle distance after said NVG has said aperture mechanism attached thereto; and moving said NVG toward or away from said at least one display screen so that said NVG are positioned at a second object-to-goggle distance that is greater or less than said first object-to-goggle distance, wherein said image produced with said NVG stays in focus throughout said moving step without adjustment of settings of said NVG, wherein said first and second object-to-goggle distances are each under 20 feet.

12. The method of claim 11, wherein said moving step moves said NVG either toward or away from said at least one display screen by at least two feet.

13. The method of claim 11, wherein said step of attaching to said NVG said aperture mechanism doubles a distance over which said NVG stays in focus throughout said moving step without adjustment of settings of said NVG.

* * * * *